United States Patent [19]
Martin

[11] Patent Number: 5,454,034
[45] Date of Patent: Sep. 26, 1995

[54] ARRANGEMENT FOR SHARING A TELEPHONE OFFICE CODE

[75] Inventor: Ronald B. Martin, Carol Stream, Ill.

[73] Assignee: AT&T Corp., Murray Hill, N.J.

[21] Appl. No.: 156,546

[22] Filed: Nov. 23, 1993

[51] Int. Cl.⁶ .............................. H04M 7/00; H04M 3/00
[52] U.S. Cl. ........................... 379/230; 379/220; 379/272
[58] Field of Search ..................................... 379/230, 269, 379/271, 272, 273, 279, 219, 220, 221, 242

[56] References Cited

U.S. PATENT DOCUMENTS

| | | | |
|---|---|---|---|
| 5,048,081 | 9/1991 | Gavaras et al. | 379/230 X |
| 5,237,604 | 8/1993 | Ryan | 379/220 |
| 5,255,315 | 10/1993 | Bushnell | 379/221 |

OTHER PUBLICATIONS

A. S. Philip, "The System X digital switching subsystem (DSS)", Sep. 1979, pp. 5–19, Systems Technology.

Primary Examiner—James L. Dwyer
Assistant Examiner—Harry S. Hong
Attorney, Agent, or Firm—Werner Ulrich

[57] ABSTRACT

An end office of the PSTN, which employs independent switching networks which share one or more office codes, is served by a single assigned node on the CCS network. The signaling processor which serves the assigned node, screens all incoming call messages (IAM)'s; directs messages which include an appropriate Channel Identification Code (CIC) to the switching network that serves that CIC; rejects messages that include an improper CIC; and requests that the calling office assign a different CIC to the incoming call.

5 Claims, 4 Drawing Sheets

FIG. 1

FIG. 2
IAM MESSAGE END SWITCH PROCESSING

FIG. 3
TANDEM SWITCH PROCESSING

FIG. 4

ARRANGEMENT FOR SHARING A TELEPHONE OFFICE CODE

TECHNICAL FIELD

This invention relates to communication switching networks which employ a Common Channel Signaling overlay network to control establishment of communication connections.

BACKGROUND OF THE INVENTION

The Public Switched Telephone Network (PSTN) comprises: a large number of end switching offices serving local subscriber lines and trunks; a smaller plurality of tandem switching offices for providing connections between end offices; a communication network comprising a large plurality of analog and digital communication paths interconnecting the end offices and tandem offices; optional data bases; and a Common Channel Signaling (CCS) overlay signaling network comprising: a number of interconnected Signal Transfer Points (STP)'s for transmitting and switching data messages among the switching offices for managing connection and release of paths of the communication network; and for conveying special service requests. For the purpose of identification in the CCS network, the switching offices of the PSTN are assigned discrete "point codes" which identify a node of the signaling network which is assigned to an office. Similarly, communication paths (trunks) between offices are assigned Circuit Identification Codes (CIC)'s which are used by the offices to establish appropriate connections through their respective communication switching networks. Switching office translations of Circuit Identification Codes identify both the point of termination of the path on the associated communication switching network and characteristics of the path, e.g., analog or digital.

Calls between subscribers are established on the basis of a National Numbering Plan which requires seven or ten digits to define a called subscriber. A seven digit directory number comprises a three digit office code and a four digit line identifier. A ten digit directory number comprises an additional three digit Area Code which precedes the office code. A modern electronic switching system can simultaneously serve a number of such office codes.

There are a number of local situations in which the operations of an existing end office can benefit from the introduction of an additional switching network which shares one or more office codes with an existing switching network. Emerging technology, e.g., introduction of digital facilities to subscribers; population growth in an area served by an end switching office; excessive traffic due to changes in calling patterns handled by an office; replacement of an existing switching network over a period of time; growth of a PBX; and introduction of an alternate service provider are examples of such local situations. When a switching network is added to an existing end office, it is generally desirable that transfer of subscriber lines between an existing switching network and a new switching network be made without changes of directory number.

A number of arrangements for sharing an office code by two switching networks have been proposed in the prior art. One such arrangement is shown in U.S. Pat. No. 5,237,604 which was issued on Aug. 17, 1993. In accordance with that patent, switching networks which share an office code are assigned different point codes and different nodes on the signaling network; and determination of the routing of Initial Address Messages (IAM)'s to the appropriate point code is left to the calling office. An office which is serving an incoming or originating call, determines whether or not the office code of the called number is shared by two switches; and if the office code is shared, a supplementary inquiry is made of a database which is accessible by a number of offices to identify the switching network that is assigned the called directory number. Armed with this information, the calling office can direct the call to the appropriate point code in the signaling network. While this prior art system achieves a desired end result, it: (a) increases the number of nodes on the signaling network; (b) requires independent signaling processors for the networks which share an office code; (c) substantially increases the call processing time of all calling offices; (d) increases traffic on the signaling network; and (e) requires installation of the shared database and updating of the records therein. In summary, this approach requires substantial modification of the overall network to accommodate a shared office code system.

The introduction of U.S. Pat. No. 5,237,604 describes two other prior art systems. One such prior art system routes all calls to an original switching network which passes calls to the added switch over foreign exchange lines; and the other referenced system provides permanent call forwarding of a directory number of a shared office code to a pseudo number of the added switch. Neither of these solutions has proved economically feasible.

Another prior art system is found in U.S. Pat. No. 5,255,315 which was issued on Oct. 19, 1993. In accordance with that patent, switching networks which share an office code are assigned different point codes and different nodes on the signaling network; and determination of the routing of call signaling to the appropriate point code is left to the calling office. If the called office determines that an incoming call is to a subscriber line served by the network receiving the incoming call, i.e., the called switching network, the called switching network: (a) directs the incoming call to the called switching network (itself); and (b) returns an Address Complete "ACCEPT" message to the calling office. However, if an incoming call is to a subscriber line served by an added switching network, the called switching network sends a special "RELEASE" message to the calling office. The release message includes a release "CAUSE" code which indicates that the called directory number is not served by the responding network and identifies the point code of the added network. The calling office generates a new IAM which is directed to the identified point code of the added network. While the system of this patent overcomes some of the problems of the prior art, the requirement for added independent point codes and added independent processors to serve those nodes remain. Additionally, there are messages such as user to user information messages which are not associated with a call having a circuit connection; this arrangement does not serve such messages. Another prior art system is disclosed in U.S. Pat. No. 5,048,081 which employs a "point code converter" to transfer signaling messages to a "new" or an "old" exchange. The two exchanges are served by separate sets of trunks and they, in turn, serve different sets of Directory Numbers. If a signaling message identifies a trunk and a Directory Number served by the "old" exchange, the message is passed to the "old" exchange and the call is handled in the normal way. Similarly, if a signaling message identifies a trunk and a Directory Number served by the "new" exchange, the message is passed to the "new" exchange and the call is handled in the normal way. However, if a signaling message identifies a trunk and a Directory Number which are not served by the same exchange, the exchange "old" or "new" that serves the trunk identified in the signaling message is treated as a "tandem" exchange for the purpose of handling the call. An "added" signaling message is generated which identifies the tandem exchange e.g., the "old" exchange as the source of the message and the other exchange e.g., the "new" exchange as the destination for the signaling message. The "new" exchange is identified by a private point code number known only to the point code converter, the old exchange and the "new" exchange. In the above example, the "old" exchange, acting as a tandem exchange, completes a call connection between the trunk identified in the original message and a tandem trunk to the "new" exchange. The new exchanges acts upon the "added" signaling message and completes a connection between the tandem trunk and the Directory Number which is identified in both the original signaling message and in the "added" signaling message.

While this arrangement provides an interface between a single signal transfer point and two offices that share an office code, calls which involve a trunk and a directory number which are not served by the same network, require a tandem path which includes a connection through the networks of both the "old" and "new" offices and the interconnecting tandem trunk. This solution is costly in that it requires the addition of the tandem trunks between the "old" and "new" exchanges; and it doubles the number of network connections required to handle such tandem connections.

DISCLOSURE OF THE INVENTION

In accordance with the present invention, an end office of the PSTN (a code sharing office), which employs independent local switching networks that share one or more office codes and serve disjoint sets of Directory Numbers (DN), is served by a single assigned node and point code on the CCS network. Similarly, in connecting offices, communication channels of trunk groups which serve a code sharing office are treated as a single facility set without distinction as to their appearance on the networks of the sharing office. Since the other member offices of the PSTN have no knowledge of the office code sharing arrangement, traffic with a code sharing office in accordance with this invention, are handled in the same way as routine calls to and from any office of the PSTN.

The signaling processor which serves the assigned node on the CCS network, screens all incoming call messages (IAM)'s; directs messages which include an appropriate Channel Identification Code (CIC) to the local switching network that serves that CIC and the Directory Number (DN) identified in the IAM in the normal manner of the prior art; but rejects messages that include a CIC from a trunk group that does not serve the DN identified in the IAM, and requests that the calling office assign a CIC from a specific trunk group or trunk group set connected to the other local switching network which serves the called subscriber to the incoming call.

Thereafter, all signaling messages which relate to an established connection through a network of a shared office are routed to the appropriate local switch within the shared office on the basis of the Channel Identification Code (CIC) and the DN which are included in all such messages. Many of the messages which contain a CIC are termed "Integrated Services User Part" (ISUP) messages.

Additionally, there are non-call-associated ISUP messages such as non-call-associated user to user information messages. Such messages may be routed originally by the directory number, and subsequently by an index as explained below.

For messages which are not associated with a call connection, and which therefore do not include a CIC, the Signaling Processor, for the purpose of correlating and routing, maintains indexed records of such messages in a scratchpad memory. Each such record in memory comprises an index value and the identity of the related local switch. In terms of the protocol on the signaling network, messages which do not include a CIC are termed "Transaction Capability Application Part" (TCAP) messages. An example of such an indexed message is a remote data base query.

Accordingly, the single node signal processor serves several switches having a common office code, without burden on other switching systems, and it can route all signaling messages to the correct local switch on the basis of: a CIC and the accompanying DN, or an indexing term.

DETAILED DESCRIPTION

Figure 1:
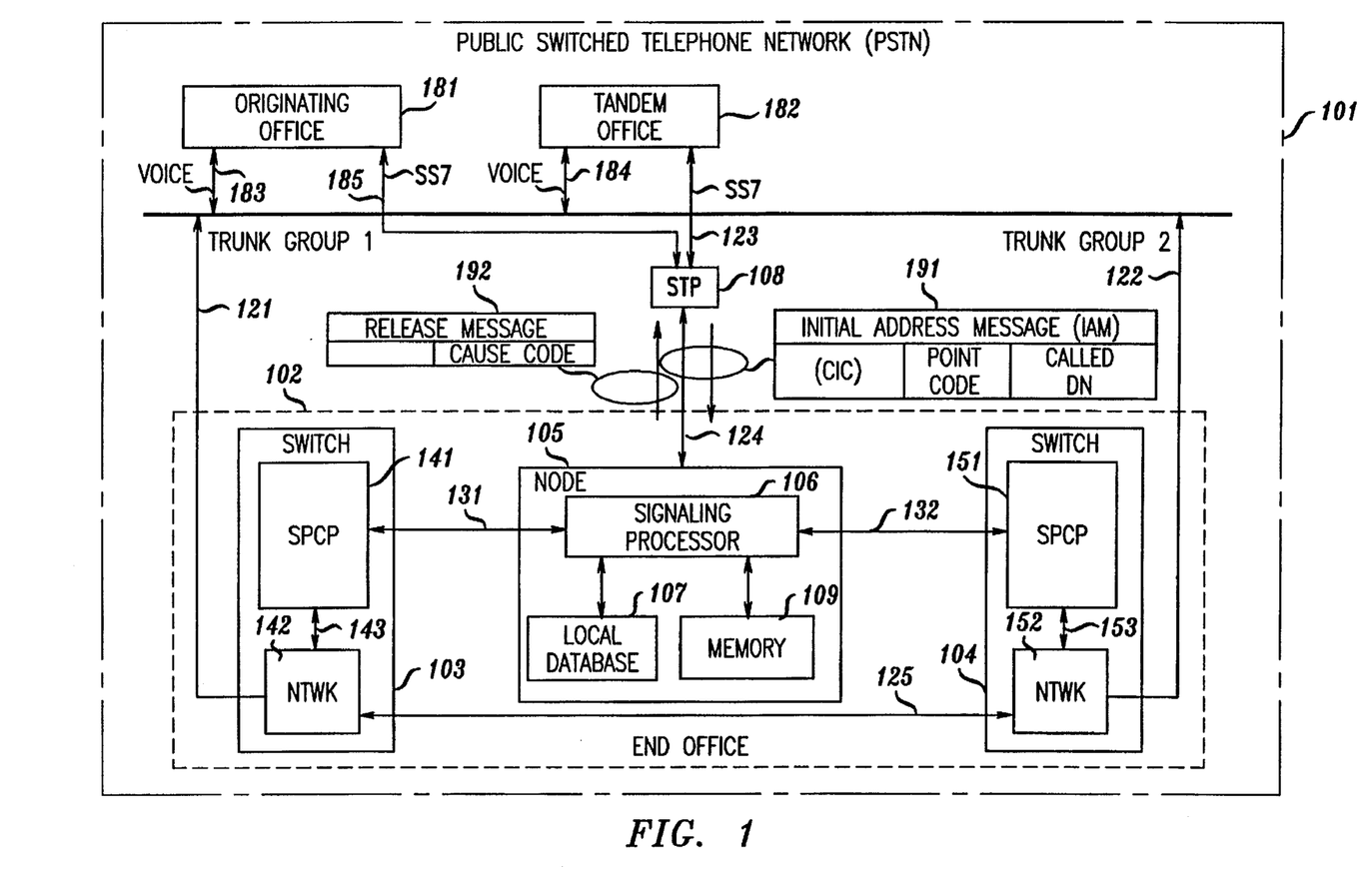
FIG. 1 is a schematic diagram of an end office with two switches sharing an office code.

FIG. 1 illustrates the practice of the present invention in the context of the Public Switched Telephone Network (PSTN). PSTN 101 comprises: a plurality of end offices, e.g., 102, 181; a plurality of Tandem offices, e.g., 182; voice network communication paths, e.g., 121,122, 183, 184; a Common Channel Signaling (CCS) network comprising: a plurality of Signal Transfer points, e.g., 108, a plurality of signaling network paths, e.g., 123, 124, 185. As seen in FIG. 1, voice Trunk Group 121 terminates in analog network 142 of switch 103; and Trunk Group 122 terminates in network 152 of digital switch 104. In accordance with the present invention, the two trunk groups, from the viewpoint of Tandem Switch 182, form a single facility set without distinction as to their physical appearances on the networks 142, 152 of office 102. In addition, a trunk group 125 interconnects networks 142 and 152 for calls between customers of switch 102 and customers of switch 103.

In FIG. 1, End Office 102 comprises two independent local switches 103 and 104 which share one or more office codes. Customers and trunks are connected to these switches on switch ports. Advantageously, from the perspective of the member offices of the PSTN, an office code sharing end office in accordance with this invention, e.g., end office 102 is indistinguishable from any other office of the PSTN. For the purpose of this description the term "switch" means a free-standing switching system with an internal Stored Program Control Processor (SPCP) and a communication network for interconnecting lines and trunks served by the switch. In the illustrative embodiment of FIG. 1, Switches 103 and 104 may be analog or digital switches available from any one or more suppliers. Solely for the purpose of this discussion, it is assumed that switch 103 is a 1A ESS™ analog switch manufactured by AT&T Network Systems and Switch 104 is a 5ESS® digital switch which is also manufactured by AT&T Network Systems. Advantageously, in accordance with the present invention, subscribers may be moved between switches 103 and 104 without a change of assigned directory number for any of a number of reasons.

A decision to add a digital switch to an analog office and to share one or more offices codes between an existing analog switch, e.g., 103 and an added digital switch 104 provides a graceful way to: (a) immediately serve subscribers who have a current need for the features of a digital network, and (b) "cap" an existing switch to migrate customers to a new technology switch over a reasonable period of time. By way of example, subscribers initially assigned to analog switch 103 may be physically transferred to digital switch 104 for service in order to take advantages of the features of the digital switch while retaining their directory number.

In Public Switched Telephone Network 101, member offices 102, 181, 182 provide interoffice communication over voice paths 121,122, 183, and 184 in accordance with information exchanged over a Common Channel Signaling (CCS) network comprising: a plurality of Signal Transfer Points, e.g., STP 108 and signaling channels, e.g., 123, 124, 185. Although information is exchanged between offices in industry standard message formats, a high level understanding of only two message formats is required to fully comprehend the present invention. The one message is termed an "Initial Address Message" (IAM) which advises an end office of a request to establish a connection through the end office between a voice channel identified in the IAM by a Channel Identification Code (CIC) and a called Directory Number (DN) which is also part of the IAM. If a received IAM is complete and otherwise in order, the receiving end office returns an "Address Complete Message" to the connected office and initiates a connection through its switching network between the voice channel which is identified by the CIC and the called DN. If a received IAM is not complete, or otherwise not in order, the end office so advises the connected office and terminates processing of the faulty IAM. As explained later herein, in the practice of the present invention, the second message of interest is a "Release Message," used when it is recognized that the call is coming in on a trunk connected to the incorrect switching network, which requests that the connected office use a channel from an identified trunk group or trunk group set and transmit a new IAM with a CIC for a channel from the requested trunk group.

Figure 2:
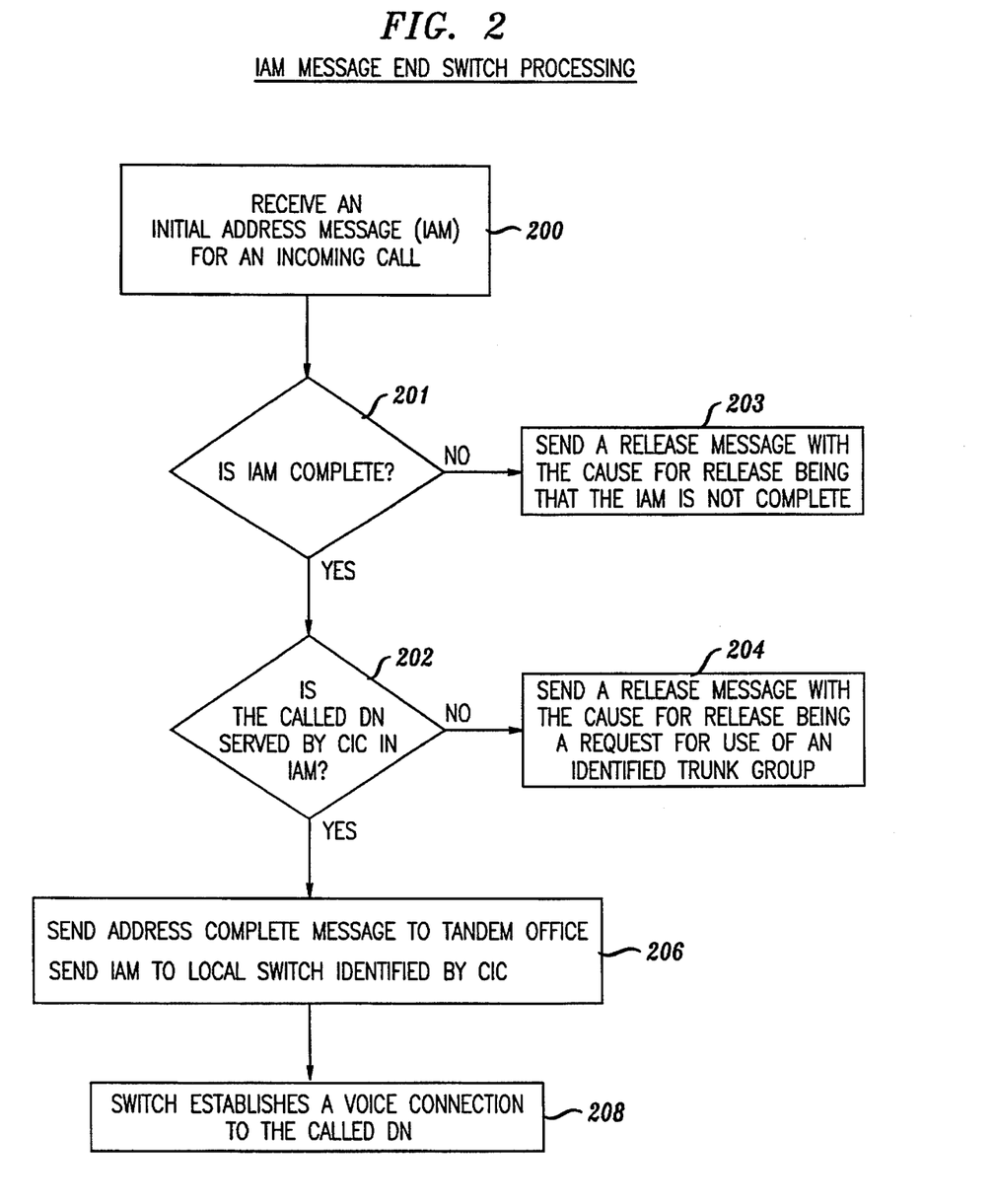
FIG. 2 is a flow diagram of end switch processing of IAM messages.
Figure 3:
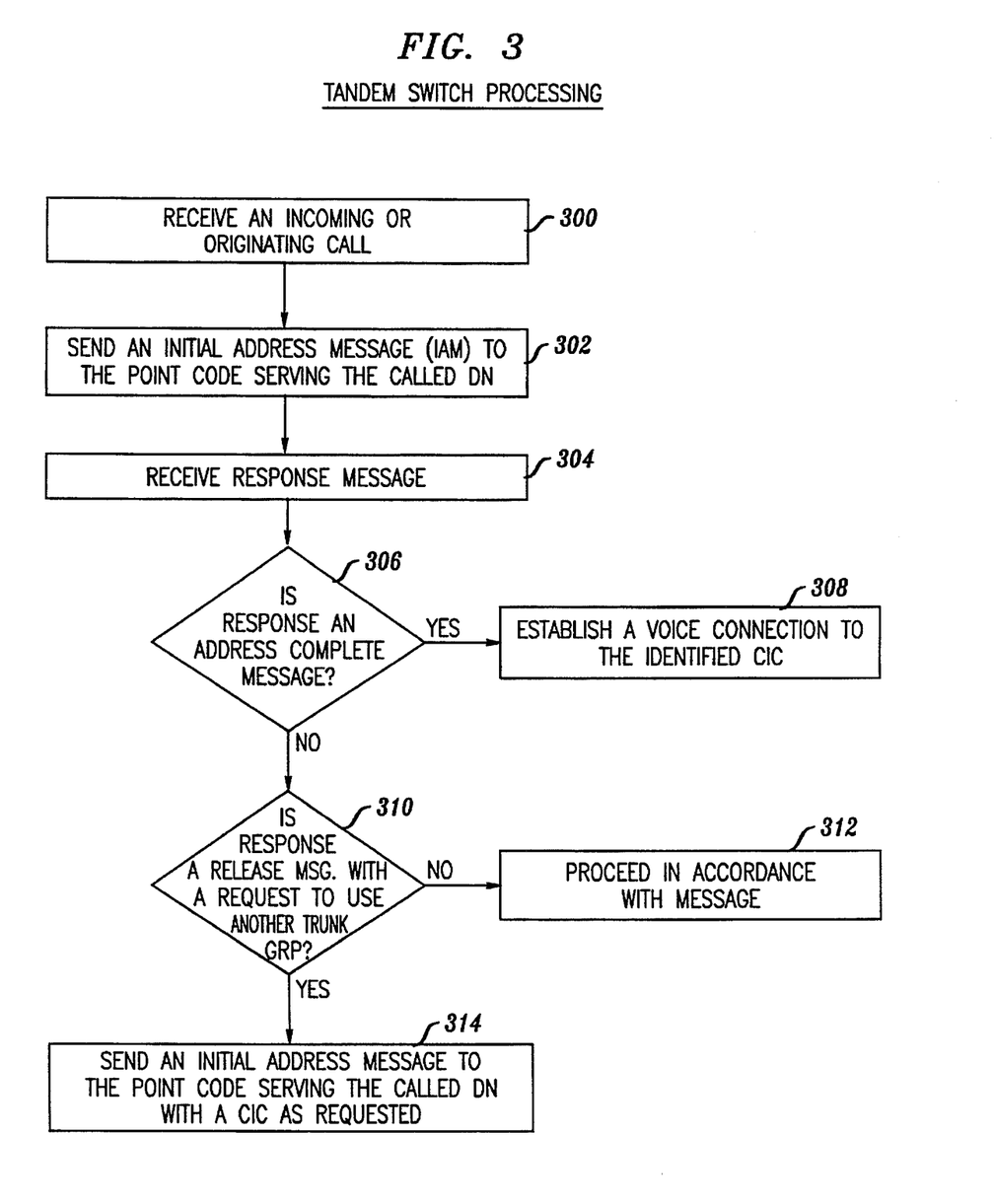
FIG. 3 is a flow diagram of call processing in a tandem office.

The flow of IAM and Release Messages is illustrated in FIG. 1, and the processing of those messages is shown in FIGS. 2 and 3. In the illustrative examples of FIG. 1, a call to a Directory Number (DN) in end office 102 originates in Originating Office 181 and passes through one or more offices of the PSTN, e.g., through Tandem Office 182 before reaching office 102. The principles of the present invention are fully understood by reference to signaling between Tandem Office 182 and End Office 102.

In an attempt to complete the call from office 181 to office 102, Initial Address Message 191 is conveyed from office 182 to office 102 via STP 108. IAM 191, in addition to administrative data, e.g., message header, etc, comprises: (a) a Point Code which identifies the signaling network node which is assigned to office 102; (b) a Channel Identification Code which identifies a channel of one of the trunk groups 121,122; and (c) the called Directory Number (DN). In FIG. 1, the node on the signaling network which is assigned to office 102 is labeled 105 and node processor 106 provides an intelligent interface between signaling network path 124 and information paths 131 and 132 which communicate with switch 103 and 104 respectively. The functionality of processor 106 is found in a 1AESS switching system. An example of a processor arrangement which is suitable for use as processor 106 is found in U.S. Pat. No. 4,752,924 which was issued on Jun. 21, 1988. It is the responsibility of processor 106 to: (a) examine all IAM messages for completeness, (b) transmit responses to IAM messages, and pass complete messages to a switch, e.g., 103. The interfaces between the node and the switches and between the node and the signaling network are called node ports on the node side and switch signaling ports on the switch side. In the implementation of the present invention, processor 106 screens IAM messages to determine whether or not the called DN and the channel code CIC, assigned by the office sending the IAM message as part of the prior art process of establishing a connection, appear on the same network. This determination is made by reference to Local Database 107 which includes data for determining DN to switch assignments. As explained later, if the DN and CIC are not assigned to the same switch, a Release Message 192 is returned to the Tandem Office 191. The possibility of wrong channel assignments to a called DN is brought about by the fact that Tandem Office 182 considers trunk groups 121 and 122 to be a single facility set. Advantageously, a large number of IAM messages to an office code sharing end office will assign a correct CIC to the called DN and the incoming call can be completed without any additional message exchange. Since it is only necessary that the called DN and the assigned CIC appear on the same switch, an IAM may make proper CIC assignments to both networks.

FIG. 2—End Switch Processing of IAM MESSAGES

The flow diagram of FIG. 2, except for decision tree 202 and action box 204 follows standard IAM processing in an end office that has a single switch. IAM messages for incoming calls, as explained earlier herein, are checked to assure that the message is complete and otherwise in good order. Decision tree 201 represents the results of such inquiry. If an IAM is not complete, or otherwise not in good order, the "NO" output of tree 202 is active and a release message is sent to the office that originated the IAM. The release message, as a cause for the message, indicates that the IAM was not complete or otherwise in good order.

If a received IAM is complete and in good order, the "YES" output of tree 201 is active, and that IAM is examined to determine whether or not the CIC and the called DN are associated with the same switch, either switch 103 or switch 104. Decision tree 202 represents the results of that inquiry. If the CIC assignment is consistent, i.e., appropriate for the called DN, the "YES" output of tree 202 is active and operations specified in action box 206 are performed. In response receipt of a complete IAM with an appropriate CIC assignment, an ADDRESS COMPLETE message is transmitted to the office that sent the IAM, the contents of the IAM are sent to the local switch which is identified by the CIC. In turn the serving switch completes a talking connection between the channel identified by the CIC and the called DN.

If the CIC in an IAM message is not consistent, i.e., is not appropriate for the called DN, the "NO" output of tree 202 is active and, as shown in action box 204, a Release Message, e.g., message 192 of FIG. 1, is sent to the office that originated the rejected IAM. As the "Cause", the Release Message requests that a channel from a particular trunk group, 121 or 122 as appropriate, be used in a new IAM for the incoming call to the DN of the rejected IAM. Alternatively, the Release Message may specify a routing index for selecting an appropriate trunk group.

Signaling messages which relate to an established connection through a network of a shared office are directed to the appropriate local switch 103, 104 within the shared office 102 on the basis of a Channel Identification Code (CIC) which is included in all such messages. Messages such as those discussed above contain a CIC and include call-associated "Integrated Services User Part" (ISUP) messages.

The Signaling Processor, for the purpose of correlating and routing related messages that do not include a CIC, maintains indexed records of such messages in a scratchpad memory. Each record in memory comprises an index value and the identity of the related local switch. In terms of the protocol on the signaling network, messages which do not include a CIC include non-call-associated ISUP messages and Transaction Capability Application Part (TCAP) messages.

An example of a non-call-associated ISUP message is a non-call-associated "User to User Information" (UUI) message of an ISDN network. This message type serves to transmit data from a calling subscriber to an identified called subscriber without establishing a network connection between the calling and called subscribers. The data is conveyed to the called subscriber by way of a User to User Information message over the signaling network. For a related set of user to user messages, the directory number may be used for routing a first such message, after which an index for a message exchange can be used for routing further messages.

Examples of TCAP messages are "Data Inquiry" and "Data Response" messages by which data requests and data responses can be exchanged between member switching systems of the PSTN or between a member switching system and a data base. The signal processor correlates related inquiry and response messages on the basis of translations of components of such messages, which may include an index or a directory number.

As seen from the above discussion, the present invention does not require any additional equipment or changes in operating procedures in offices other than the sharing end office.

FIG. 3—Tandem Switch Processing of IAM MESSAGES

The flow diagram of FIG. 3, except for decision tree 310 and action box 314 follows standard IAM and response message processing in a tandem office. Upon receipt of an incoming or originating call (action 301), the tandem office prepares and sends an Initial Address Message (action 302) to the point code serving the called DN; and thereafter expects to receive a response message (action 306). If a response message is an address complete message, the YES output of tree 306 is active and a voice connection is established to the CIC identified in the related IAM (action 308). If the response message is not an address complete message, inquiry is made to determine the nature of the response. Decision tree 310 shows the disposition of such inquiry. If the response is a release message with a request to assign a channel in an identified trunk group, the YES output of tree 310 is active, and a new IAM, with a CIC as requested, is transmitted to the point code serving the called DN (action 314). If the response is not such a message, the NO output of tree 310 is active and disposition of the message is as in the Prior Art (action 312). Since all IAM messages are identical in form, processing of a replacement IAM in an end office is as described above herein with respect to an original IAM.

Figure 4:
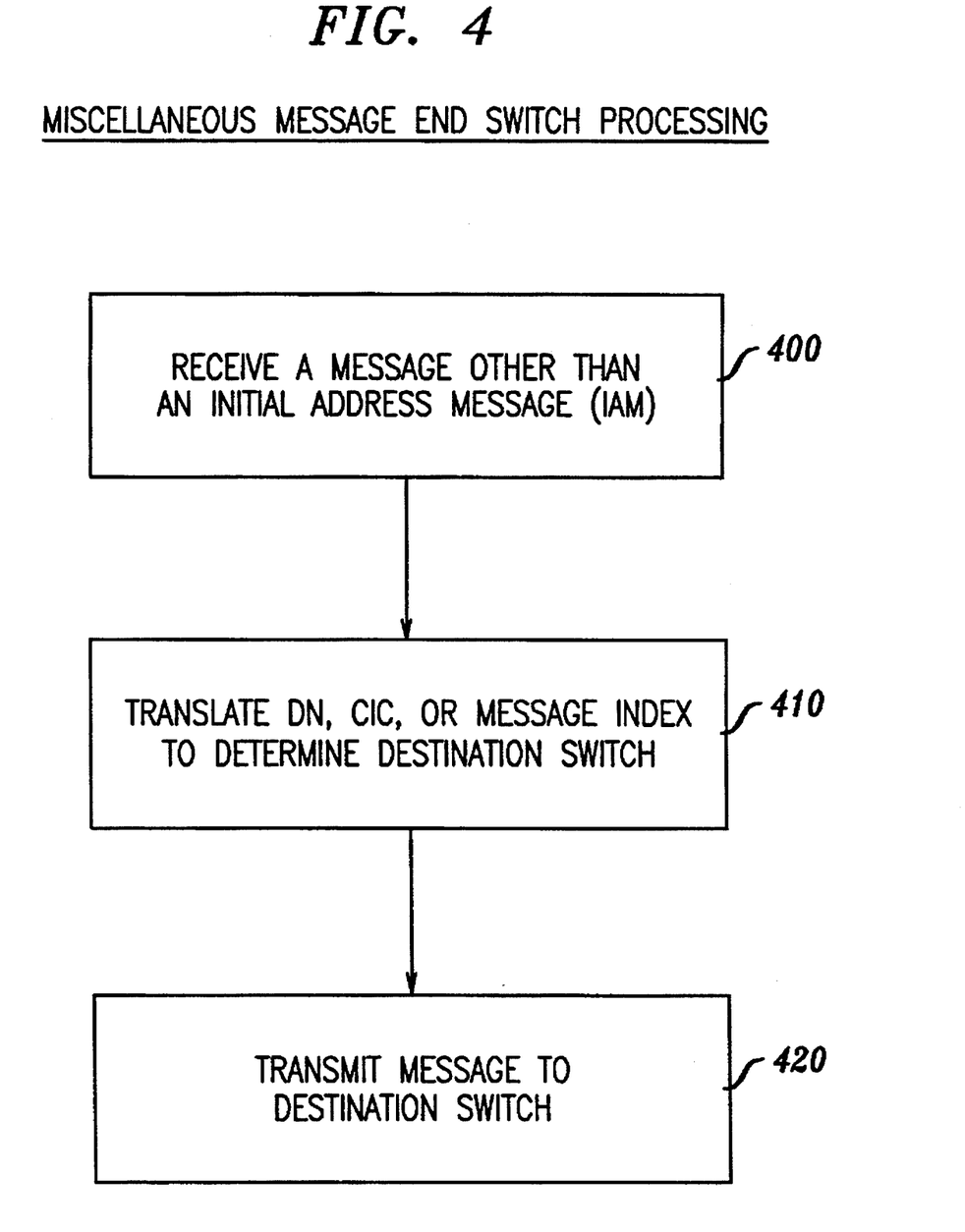
FIG. 4 is a flow diagram of end switch processing of miscellaneous messages.

FIG. 4—End Switch Processing of Miscellaneous Messages

For the purpose of this discussion, a miscellaneous signaling message is any message other than an IAM. It can be a call related message following an IAM, or it can be a message not associated with a call connection, e.g., TCAP. Action block 400 represents receipt of a miscellaneous message. Depending on the type of message, action block 410 translates the DN, CIC, or Message Index of a received message to determine the correct destination switch for the message. In response to such determination signaling processor 106 transmits the message data to that correct destination switch.

This arrangement can also be used for connections to a switch of a Competitive Access Provider (CAP). The CAP switch serves customers whose telephone numbers have not been changed and whose office code was formerly served by a switch such as switch 141. Effectively, the CAP switch is just another switch, sharing an office code, whose signaling is provided from the common signaling node.

Connections between the two switches of the end office can be via a direct trunk group 125 as shown, and over alternate routes via tandem switches. Conventional techniques may be used in selecting such alternate routes.

The invention has been described with particular attention to its preferred embodiment; however, it should be understood that variations and modifications within the spirit and scope of the invention may occur to those skilled in the art to which the invention pertains.

I claim:

1. A method of routing signaling messages, not associated with call connections, in a communication switching office that comprises at least two independent switches serving disjoint sets of directory numbers of a common office code, and each switch comprises a free-standing switching system comprising a communication network limited to interconnecting lines and trunks served by the switch the method comprising:

receiving signaling messages which do not distinguish between the switches serving the common office code in a facility common to said switches;

determining the correct destination switch for each said signaling message on the basis of data of each said message, wherein said data comprises a directory number of said common office code;

transmitting each said signaling message from said common facility to said correct destination switch.

2. The method of claim 1 wherein said data comprises an index for a group of messages.

3. The method of claim 1 wherein the step of receiving comprises: receiving said signaling messages in a facility that is identified by a single point code.

4. In a communication switching office that comprises at least two independent switches serving disjoint sets of directory numbers of a common office code, and corresponding first and second pluralities of trunk channels individually identified by Circuit Identification Codes (CIC); and each switch comprises a freestanding switching system comprising a communication network limited to interconnecting lines and trunks served by the switch
   a method of routing signaling messages identified by a single point code to one of said switches
   comprising:
   (a) receiving messages in a facility common to said switches;
   (b) determining whether two data fields of a message point to the same switch; and
   (c) if said two data fields do point to the same destination switch, transmitting said signaling message from said common facility to said same destination switch;
   (d) rejecting said signaling message if said two data fields do not point to the same destination switch
   (e) transmitting a Release Message (RM) to the communication switching system that originated the rejected signaling message, and as a Cause for release requests a new IAM with a CIC for a channel of an identified one of said first and second pluralities of trunk channels.

5. An office code sharing end office communication switching system for use in the Public Switched Telephone Network (PSTN), wherein the PSTN comprises a communication switching network comprising: a plurality of member communication switching systems and a plurality of interconnecting communication channels; and a Common Channel Signaling (CCS) network comprising: a plurality of Signal Transfer Points (STP), a plurality of nodes each having individually assigned discrete point codes, and interconnecting signaling channels;
   said office code sharing end office communication switching system comprising: a first switch serving at least one office code in a national numbering plan and comprising:
      a first network comprising: a plurality of subscriber line ports assigned individual directory numbers (DN), and a first plurality of trunk ports for connection to a first plurality of trunk channels of said plurality of interconnecting communication channels;
      a first signaling port; and
      a first control processor coupled to said signaling port for controlling
      establishment and release of connections through said first network;
   a signaling node, on said Common Channel Signaling network, identified by one of said discrete point codes of said CCS; and comprising:
      a CCS node port for connection to said Common Channel Signaling (CCS) network;
      a first switch node port for communication with said first signaling port; and
      a signaling processor coupled to the ports of said node for: receiving, validating, and processing signaling messages; for generating response messages; and for routing outgoing signaling messages to said node ports
   said office code sharing end office communication switching system further comprises: a second switch, serving, on a shared basis, at least one of said office codes served by said first switch, and comprising:
      a second network comprising a plurality of subscriber line ports assigned individual directory numbers different from those served by said first network, and a second plurality of trunk ports for connection to a second plurality of trunk channels of said plurality of interconnecting
      communication channels;
      a second signaling port; and
      a second control processor for controlling establishment and release of connections through said second network;
   said signaling node further comprises:
      a second switch node port for communication with said second signaling port;
   the channels of said first and second pluralities of channels are assigned discrete Circuit Identification Codes (CIC), certain of said signaling messages, Initial Address Messages (IAM) identify a called Directory Number and a CIC to be connected for communication;
   said signaling processor accepts, as consistent, an IAM in which the called DN and the requested CIC appear on the network of the same switch; and
   routes a consistent IAM to a switch node port on the basis of the requested CIC
   said signaling processor, in response to receipt of an inconsistent IAM in which the DN and the requested CIC do not appear on the same switch, transmits a Release Message (RM) to the communication switching system that originated the inconsistent IAM, and as a Cause for release requests a new IAM with a CIC for a channel of an identified one of said first and second pluralities of trunk channels.

* * * * *

UNITED STATES PATENT AND TRADEMARK OFFICE
CERTIFICATE OF CORRECTION

PATENT NO. : 5,454,034

DATED : September 26, 1995

INVENTOR(S) : Ronald B. Martin

It is certified that error appears in the above-identified patent and that said Letters Patent is hereby corrected as shown below:

Column 10, following the line reading "of the requested CIC" printed adjacent to line number 40, insert a new line reading —Characterized in that—.

Signed and Sealed this

Twentieth Day of February, 1996

Attest:

BRUCE LEHMAN

*Attesting Officer*

*Commissioner of Patents and Trademarks*